United States Patent [19]

Schlesch et al.

[11] Patent Number: 4,875,428
[45] Date of Patent: Oct. 24, 1989

[54] MOTORIZED OUTRIGGER DRIVE

[75] Inventors: Ronald D. Schlesch; Merrill H. Armstrong; Stafford J. Vallery; Harold S. Durham, all of Stuart, Fla.

[73] Assignee: Armstrong International, Inc., Three Rivers, Mich.

[21] Appl. No.: 141,020

[22] Filed: Jan. 5, 1988

[51] Int. Cl.⁴ .............................................. B63B 35/14
[52] U.S. Cl. ..................................... 114/255; 43/6.5; 43/21.2; 43/26.1
[58] Field of Search ................. 114/255; 43/6.5, 27.4, 43/21.2, 26.1; 198/814

[56]  References Cited

U.S. PATENT DOCUMENTS

| | | | |
|---|---|---|---|
| 284,723 | 9/1883 | Colahan | 198/814 |
| 449,676 | 4/1891 | Hall . | |
| 1,471,726 | 10/1923 | Ginty . | |
| 2,242,716 | 5/1941 | Woodward . | |
| 2,274,512 | 2/1942 | Weimer . | |
| 2,488,451 | 11/1949 | Ursich | 43/6.5 |
| 2,741,052 | 4/1956 | Shibuya | 43/6.5 |
| 2,802,366 | 8/1957 | Borner . | |
| 3,302,932 | 2/1967 | Wallin . | |
| 3,355,835 | 12/1967 | Lyons | 43/6.5 |
| 3,835,567 | 9/1974 | Humbert et al. | 43/6.5 |
| 3,949,969 | 4/1976 | Kaufer . | |
| 4,196,640 | 4/1980 | Rydberg . | |
| 4,339,811 | 7/1982 | Bednarz et al. | 43/26.1 |

Primary Examiner—Sherman D. Basinger
Assistant Examiner—Thomas J. Brahan
Attorney, Agent, or Firm—Flynn, Thiel, Boutell & Tanis

[57] ABSTRACT

A motorized outrigger drive for an outrigger on a fishing boat, the outrigger being of the kind having a boom fixedly cantilevered laterally outboard from the side of the boat for releasably trailing a fishing line from a point laterally spaced outboard from the side of the boat and thereby to minimize risk of tangling while simultaneously trolling with several fishing lines. An outrigger line loops around an outboard line direction changing means fixed adjacent the free end of the boom and a motorized drive unit fixed with respect to the boom and boat. The motorized drive unit reversibly feeds the outrigger line. A traveler unit is carried on the outrigger line and has a portion supporting a fishing line release.

24 Claims, 6 Drawing Sheets

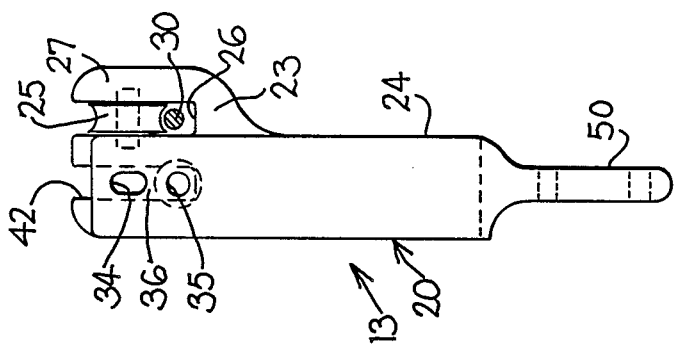
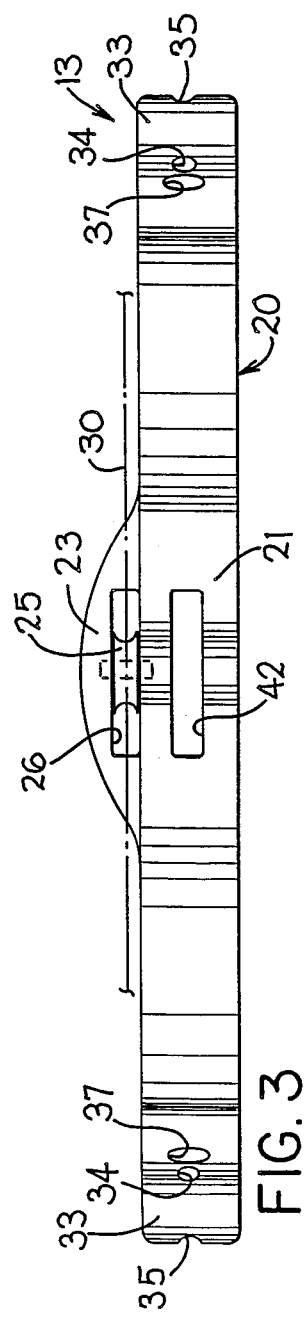
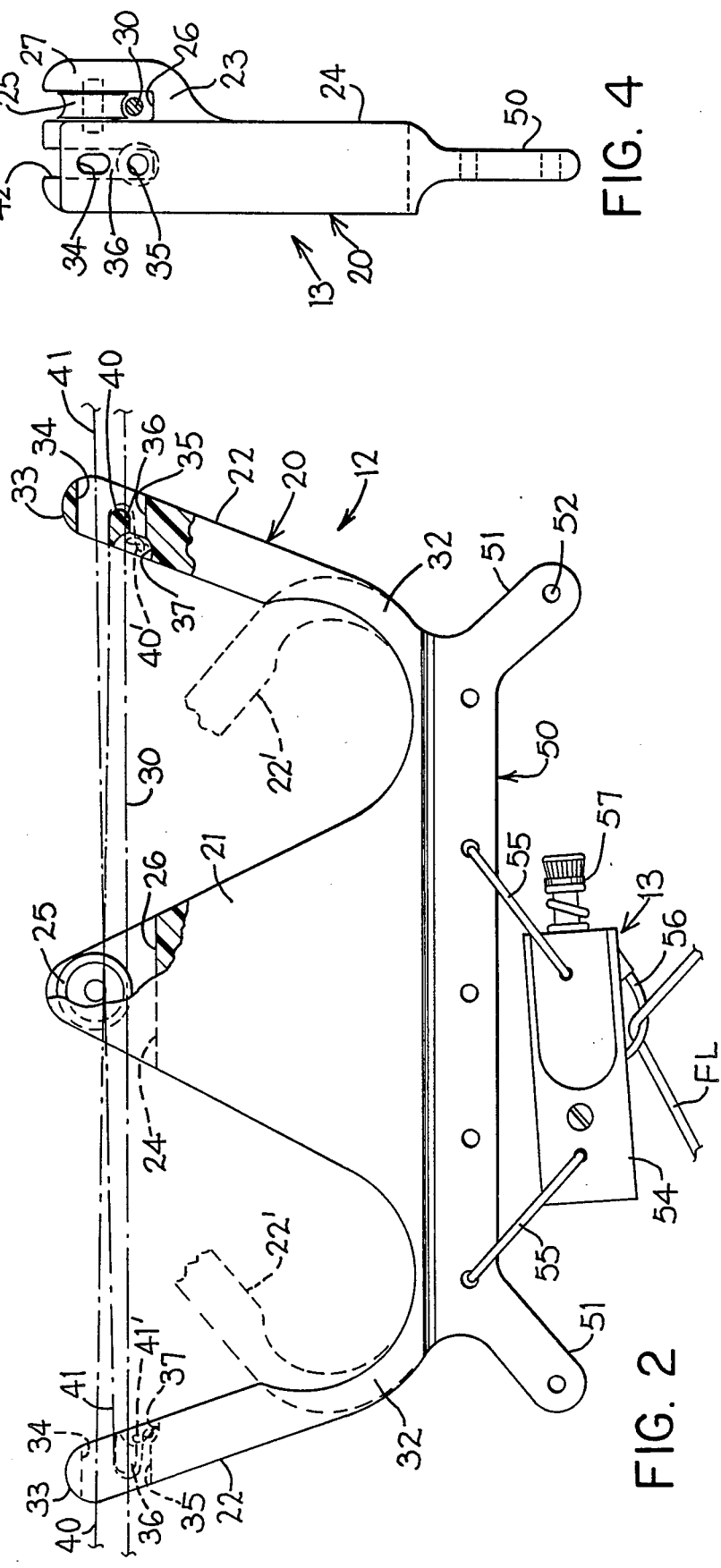
FIG. 4
FIG. 3
FIG. 2

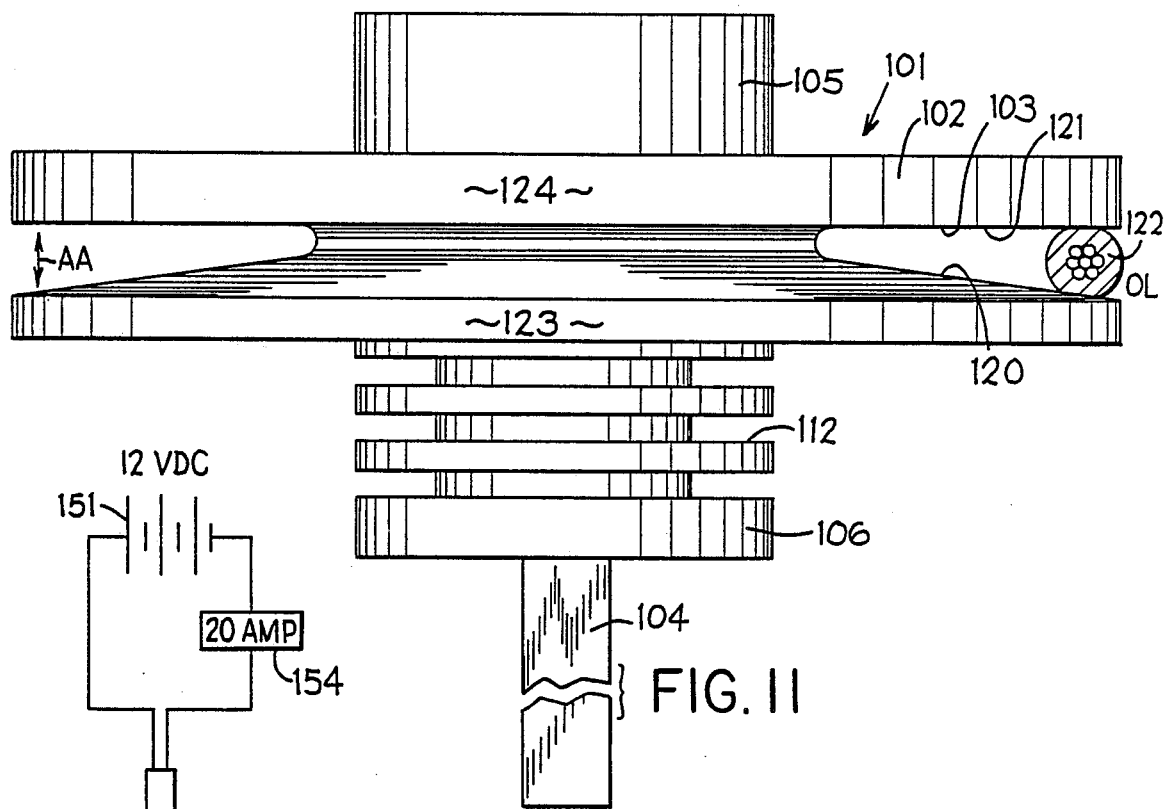
FIG. 11
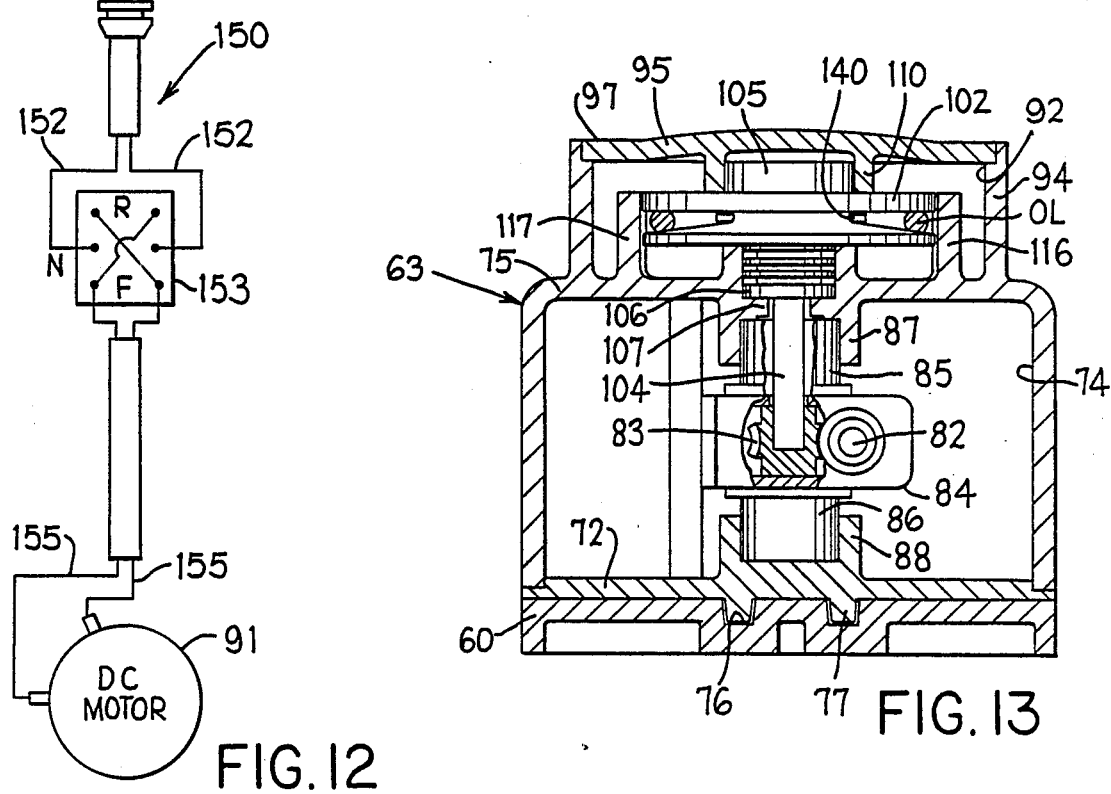
FIG. 12
FIG. 13

MOTORIZED OUTRIGGER DRIVE

FIELD OF THE INVENTION

This invention relates to an outrigger drive for an outrigger of a fishing boat, the outrigger being of the kind having a boom fixedly cantilevered laterally outboard from the side of the boat for releasably trailing a fishing line from a point laterally spaced outboard from the side of the board.

BACKGROUND OF THE INVENTION

Outriggers of the above mentioned kind are known and are provided to minimize risk of tangling fishing lines while simultaneously trolling with several fishing lines to give a wider area of coverage while trolling.

In prior outrigger systems known to us, the fisherman moves the outrigger line by hand to move the fishing line release unit to the side of the boat, attaches the fishing line to the release, and then reverses the direction of the outrigger line and by hand moves the release out to near the free end of the outrigger pole. However, it is difficult for an individual fisherman both to handle his fishing line and manipulate the outrigger line manually in the above described manner. Moreover, when feeding the outrigger line by hand, there is a tendency to move same in an unsteady, jerky manner, thereby creating a risk of release of the fishing line by the release unit on the outrigger line.

Accordingly, the objects of the present invention include:

1. to provide a motorized outrigger drive for an outrigger on a fishing boat which is intended to overcome the disadvantages of the above mentioned prior art type;

2. to provide an outrigger drive as aforesaid which, with a simple flick of a switch, automatically takes the outrigger release unit quickly and smoothly out to its outboard trolling position adjacent to the end of the outrigger boom, and which with another flick of the switch returns the outrigger release quickly back to the side of the boat;

3. to provide an outrigger drive as aforesaid which maintains the outrigger line under tension and it delivers steady line feed and which avoids the need for extra springs, rubber shock cords or the like;

4. to provide an outrigger drive as aforesaid which is operable from the standard boat electrical system (e.g. 12 volt electrical system), which mounts easily with conventional hand tools on either vertical, inclined, or horizontal surfaces of the boat, and which may provide for automatic overload protection, as well as for either automatic or manual outrigger line advancement and retraction;

5. to provide an outrigger drive as aforesaid capable of utilizing standard outrigger line, or a variety of conventional lines, for example including Dacron braided line of widely available type and which is capable of positively driving such line to advance and retract the line release unit;

6. to provide an outrigger drive as aforesaid in which the drive unit is capable of automatically selfadjusting adjusting its position to provide for proper alignment with the outrigger line as the latter extends out to the outboard portion of the outrigger boom; and 7. to provide a pulley drive system usable for a variety of rotational drives, including a motorized outrigger drive, in which low line or belt wear, stress and tension can be achieved.

SUMMARY OF THE INVENTION

The objects and purposes of the invention are met by providing a motorized outrigger drive for an outrigger on a fishing boat, the outrigger being of a kind having a boom fixed to and cantilevered laterally outboard from the side of the boat for releasably trailing a fishing line from a point laterally spaced outboard from the side of the boat, the motorized outrigger drive comprising an outrigger line, an outboard line direction changing means fixed adjacent the free end of the boom, motorized drive means actualy for reversibly feeding said outrigger line, and traveller means carried on said outrigger line and having means supporting a fishing line release.

BRIEF DESCRIPTION OF THE DRAWINGS

FIG. 2 is an enlarged, partially broken top view of a traveller according to FIG. 1.

FIG. 3 is a front view of the FIG. 2 traveller.

FIG. 4 is an outboard end view of the FIG. 2 traveller.

FIG. 11 is an enlarged side view of the drive pulley of FIG. 7.

FIG. 12 is a schematic diagram of a manual control circuit for the FIG. 5 motorized drive unit.

FIG. 13 is a sectional view taken on the line XIII—XIII of FIG. 7.

DETAILED DESCRIPTION

Figure 1:
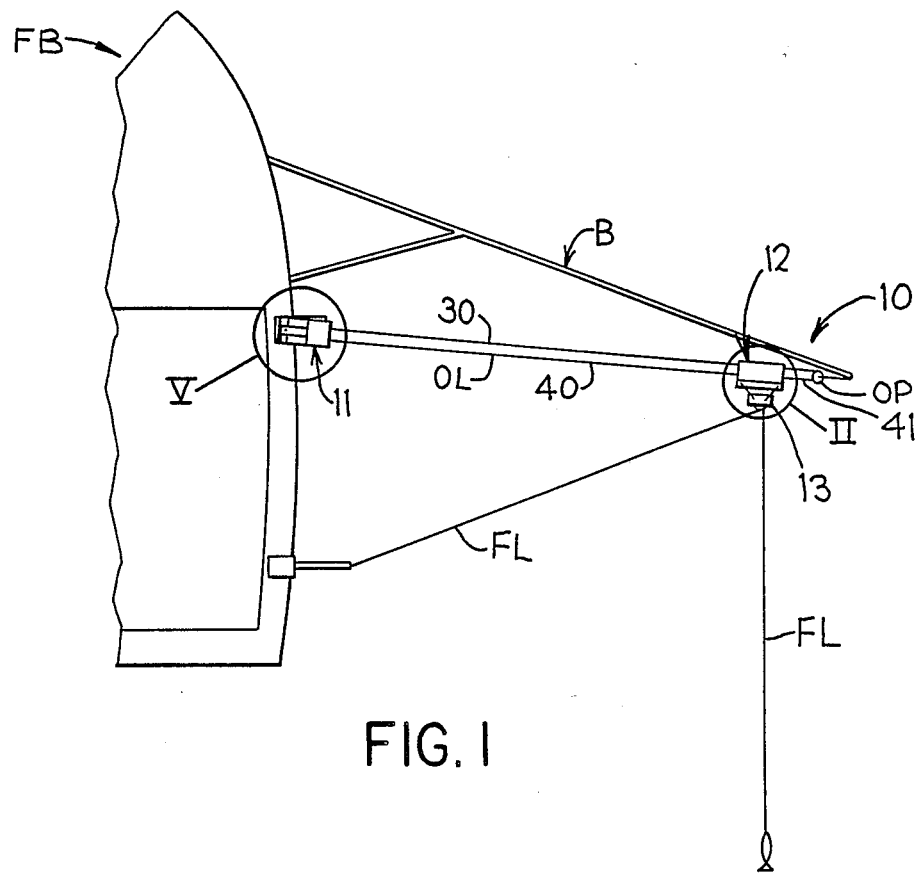
FIG. 1 is a partially broken, schematic top view of a fishing boat having an outrigger and a motorized outrigger drive according to the present invention.

Turning to FIG. 1, a fishing boat FB has a boom B fixedly cantilevered laterally outboard from the side thereof for releasably trailing a fishing line FL from a point laterally spaced outboard from the side of the boat to minimize risk of tangling fishing lines when simultaneously trolling with several fishing lines. An outboard line direction changing means, for example an outboard pulley OP, is supported at the free end portion of the boom and an outrigger line OL is reeved around the outboard pulley and extends from it generally toward the fishing boat FB. To the extent above described, the FIG. 1 apparatus is substantially conventional.

Turning now more particularly to a preferred embodiment of the present invention, the motorized outrigger drive 10 embodying the invention includes a motorized drive unit 11 fixed with respect to the boat and boom (and in the embodiment shown fixedly mounted on the fishing boat FB, and engaging the inboard bight of the outrigger line OL). The motorized drive unit 11 is actuable for reversibly feeding the outrigger line around the outboard pulley OP. A traveller 12 is carried on the outrigger line and supports the fishing line release 13. The fishing line release 13 may be of conventional type and is adapted to support the fishing line FL to run loosely therethrough and to release the fishing line FL when a fish strikes the baited end of the fishing line, so that the fish can be "played". In general the motorized drive unit 11 is actuable to drive the outrigger line OL around the outboard pulley OP either to move the traveller 12 from the boat toward the outboard pulley or vice versa.

The traveller 12 (FIGS. 2–4), in its relaxed shape shown, comprises a substantially W-shaped body 20 having a central inverted V-portion 21 (FIG. 2) and a pair of arms 22 flanking said central portion 21. The arms 22 are outboard of and resiliently fixed to the central portion 21. An L-cross section flange 23 (FIG. 4) on the back 24 of the body 20 is centered behind the upper end of the central portion 21 and a guide pulley 25 is rotatably supported in a slot 26 behind between the back 24, the body 20 and the upstanding leg 27 of the L-section flange 23. Accordingly, the guide pulley 25 supports the traveller 12 on central reach 30 (FIG. 1) of the outrigger line OL, the outrigger line central reach 30 being trapped by the pulley 25 in the slot 26.

The arms 22 have reduced thickness portions 32 at their lower ends adjacent to their joinder to the central inverted V-portion 21. The body 20 is of a relatively stiff resilient rubber-like material, such as a resilient plastic material, such that pulling the free end portions 33 of the arms inward toward the central portion 21 causes the arms to bend inward as indicated for example in broken lines at 22'. When freed from external forces, the arms 22 flex back to their solid line positions in FIG. 2.

The arms 22 are arranged symmetrically with respect to the central portion 21. Each arm free end portion 33 comprises a through opening 34, the through openings 34 being coaxially aligned and at about the height of the axis of the guide pulley 25. However, the common axis of the through openings 34 is offset forwardly from the guide pulley 25 and its groove 26. The arm free end portions 33 have a second pair of coaxial through openings 35 therethrough, spaced below the first mentioned through openings 34 each by a web portion 36 of the arm 22. The adjacent, facing ends of the second through openings 35 define enlarged, semi-spherical recesses 37.

In addition to the central reach 30 (FIG. 1), the outrigger line OL has inboard and outboard end reaches 40 and 41 respectively extending between the motorized drive unit 11 and the traveller 12 and between the traveller 12 and outboard pulley OP. The inboard and outboard reaches 40 and 41 are fixed symmetrically to the arms 22 of the traveller 12 as seen in FIG. 2. More particularly, the outboard reach 41 extends from the outboard pulley OP through the opening 34 in rightward arm 22, in front of pulley 25 (through a groove 42 in the top of the central inverted v-shaped portion 21), thence leftwardly around the portion 36 of the leftward arm 22, entering the opening of 34 therein, and then reversing direction to the right through the opening 35 therein to terminate in a stop knot which is trapped in the recess 37 in the leftward arm 22. Similarly, the inboard reach 40 extends through the opening 34 in leftward arm 22, through the groove 42 in central portion 21, rightwardly through the opening 34 in rightward arm 22, and then bends reversely and hence leftwardly around the portion 36 of leftward arm 22 and thus extends leftwardly through the opening 35 in rightward arm 22 to terminate in a stop knot which is trapped in the recess 37 of the rightward arm 22. The stop knots are indicated at 40' and 41' respectively. Accordingly, to maintain tension on the outrigger line OL, the knots 40' and 41' are tied while bending the upper ends of the arms 22 toward each other, substantially to their inward dotted line position as 22'. Since the arms 22 resiliently resist such inward bending, the traveller 12 increases the tension on the outrigger line OL.

Along the bottom (in FIG. 2) of the body 20, the traveller 12 includes a reduced thickness flange 50 (FIGS. 2 and 4) extending substantially the width of the bottom portion of the body 20 and having a pair of downwardly divergently angled legs 51. Spaced holes 52 through the thickness of the flange 50 are provided for supporting a conventional fishing line release 13. In the embodiment shown, the conventional fishing line release 13 includes a base 54 releasably secured to the flange 50 by clips 55 releasably engaging holes 52 in the flange 50. A catch 56 normally secures the fishing line FL but, in response to an increase in tension in the fishing line FL beyond a preset limit, the catch 56 moves with respect to the base 54 to release the fishing line FL in a manner not shown. A spring loaded control handle 57 controls the release force of the catch.

Thus, it will be seen that the traveller 12 not only supports the line release 13 for movement between the fishing boat FB and the outer end of the boom B, but additionally maintains tension on the outrigger line OL as the traveller 12 is moved in and out between the fishing boat and the outer end of the boom B, as well as and during trolling.

Figure 5:
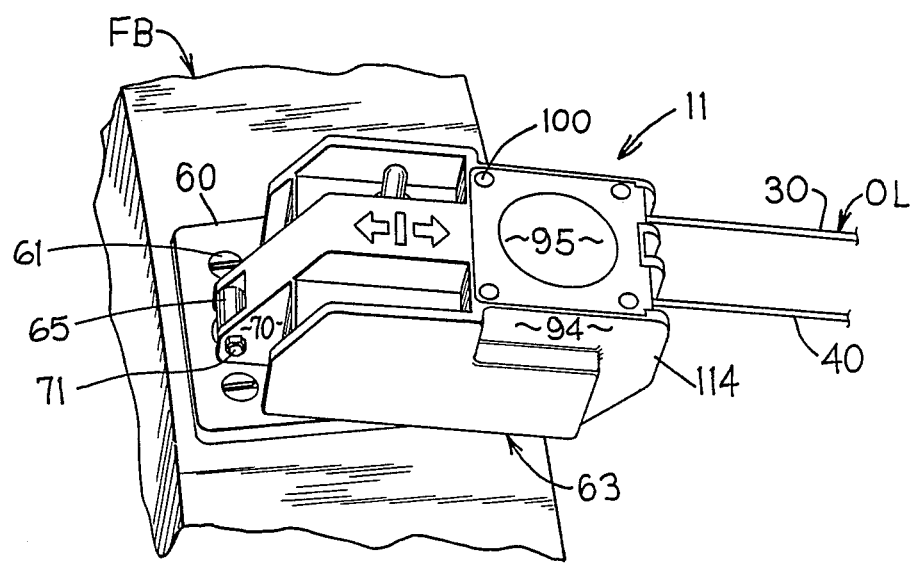
FIG. 5 is a pictorial view of the motorized drive unit of FIG. 1.

The motorized drive unit 11 (FIG. 5) comprises a mounting base 60 removably fixable by screws, bolts or the like, indicated at 61, to the fishing boat FB adjacent the side thereof, at a convenient location with respect to the boom B and fishing line FL. The mounting base may be positioned in any desired orientation and hence may be mounted on any desired surface of the fishing boat FB, be it horizontal, vertical or sloped.

The drive unit 11 includes a housing 63 (FIGS. 5-7) at its left end mounted by means of a swivel unit 64 on the left end portion of the mounting base 60. The swivel unit 64 comprises an upstanding post 65 (FIG. 7) rising above the mounting base 60. The post 65 is fixed to and extends upward from a stepped base 66 rotatable about a vertical axis and within a correspondingly stepped hole 67 in the mounting base 60.. A pair of leftward extending flanges 70 protrude leftwardly from the housing 63 and straddles the post 65 and are pivotally fixed by means of a bolt 71 to the post 65.

The stepped configuration of the base 66 and hole 67 prevents the post 65 from being picked up (in FIG. 7) out of the hole 67. The bolt 71 causes the housing flanges 70 to prevent the post 65 from dropping downward through the hole 67. Indeed, the edges of the flanges 70 are rounded at 72 to slidably engage the mounting base 60 as the housing 63 rotates upward, in the direction of the arrow A away from the mounting base 60 and about the axis of the bolt 71. Thus, the housing 63 can rotate about the bolt 71 from its substantially horizontal position of FIG. 7 upward to a substantially vertical position and, indeed, even therebeyond.

Figure 6:
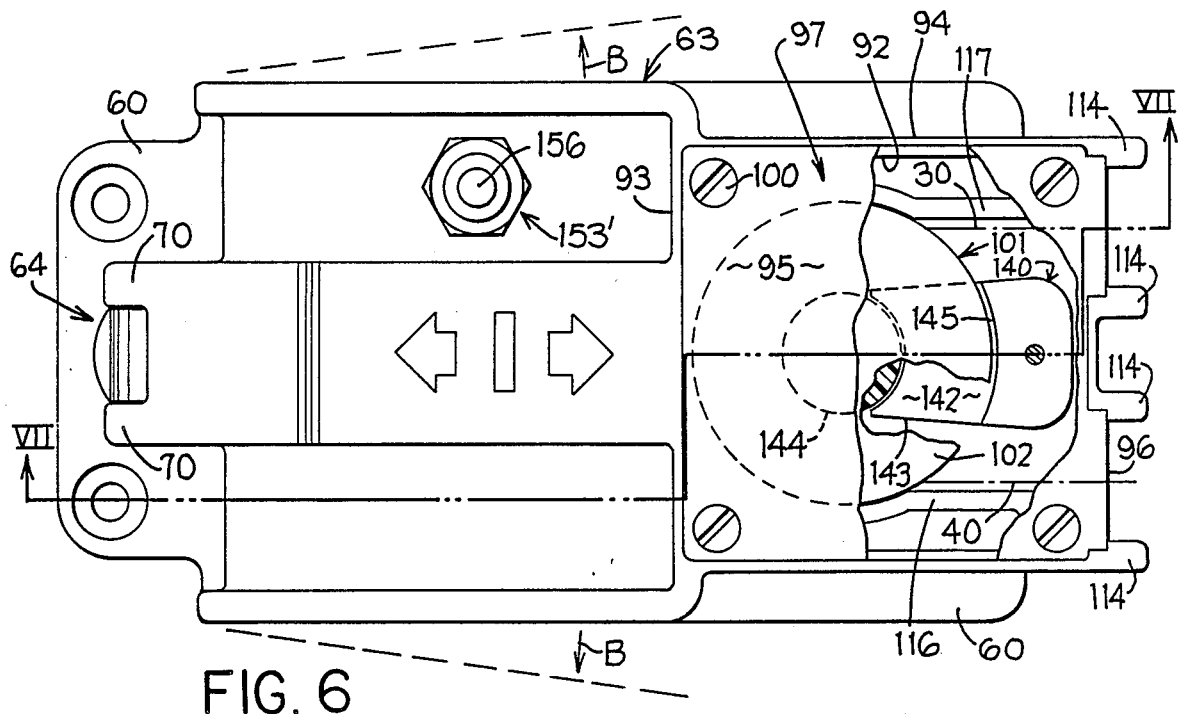
FIG. 6 is a partially broken top view of the FIG. 5 motorized drive unit.

In addition, and after the housing 63 has pivoted upward sufficient to clear the mounting base 60, such housing 63 can then rotate freely around the vertical (FIG. 7) axis defined by the post 65 as it rotates within the hole 67, namely clockwise or counter-clockwise in the direction of the arrows B in FIG. 6. The housing 63 is thus free to assume any position in a hemispherical space above (in FIG. 7) the mounting base 60. This freedom of orientation of the housing 63 with respect to the mounting base 60 permits a drive pulley (hereafter discussed) therein to orient itself in an optimum orientation with respect to the outrigger line OL leading to the outboard pulley OP, independent of the location and orientation of the mounting base 60 on the boat. This allows the mounting base 60 to be freely positioned on the boat, i.e. in any desired orientation on any desired facing surface.

Figure 7:
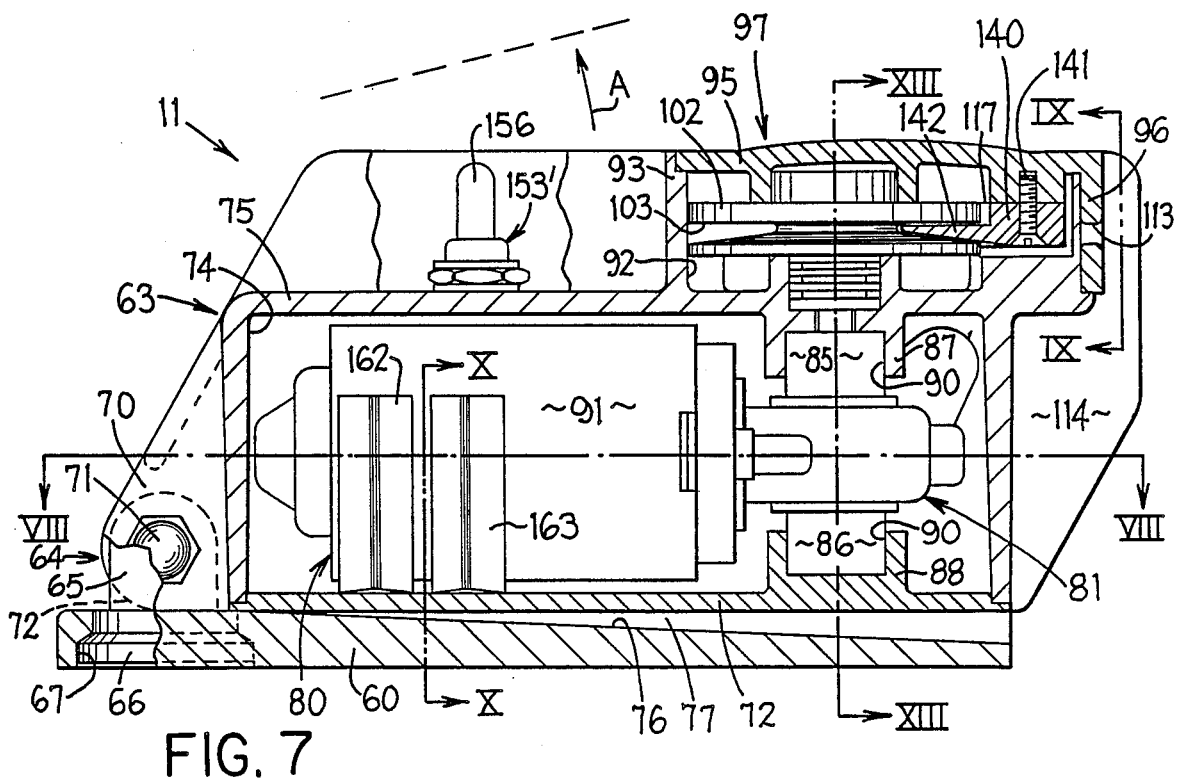
FIG. 7 is a partially broken sectional view substantially taken on the line VII—VII of FIG. 6.

The housing 63 includes an intermediate base 73 (FIG. 7) which forms the floor of a housing 63 and extends rightwardly (FIG. 7) from the swivel unit 64 toward the rightward end of the mounting base 60. The intermediate base 73 may, when there is no tension on the outrigger line OL, simply lie in face to face contact upon the mounting base 60 as shown in FIGS. 6 and 7.

Locking of the housing against pivotal motion laterally with respect to the mounting base 60 facilitates handling of the motor drive unit 11 for packing, shipping and commercial display, and also allows the housing 63 to be temporarily fixedly located on the mounting base 60 (no longer free to swivel on the swivel unit 64) when the outrigger boom B and outrigger line OL are conventionally relocated from the fishing position shown in FIG. 1 to a stowed position (not shown), for example for running the fishing boat FB in crowded waters and for docking or slipping the fishing boat FB. The housing 63 may be thus locked in its FIG. 7 and 13 position in face to face contact atop the mounting base 60 by any convenient means.

To this end, in the embodiment shown, the mounting base 60 (FIGS. 7 and 13) has in its upper surface a pair of rightwardly (FIG. 7) sloping parallel grooves 76 symmetrically located thereon. Complimentary ramps 77 are fixed on the under side of the intermediate base 72. With the intermediate base 72 seated firmly on the mounting base 60, the ramps 77 are received in the grooves 76 and positively prevent pivoting of the intermediate base 72, and hence housing 63, laterally (horizontally in FIGS. 7 and 13) with respect to the mounting base 60. However, with the housing 63 pivoted upward a few degrees in the direction of the arrow A in FIG. 7, the grooves and ramps are disengaged, allowing free lateral pivoting of the housing 63 with respect to the mounting base 60.

The ramps 77 and grooves 76 are here both slightly widened at the bottom (FIG. 13) so as to interfit in a resilient, snap fit manner, so that the human operator can ready the motorized drive unit 11 for fishing simply by engaging the rightward end thereof, adjacent the ribs 114, and pulling same upwardly (FIG. 7 and 13) away from the mounting base 60, whereupon the housing 63 is free to swivel with respect to the mounting base 60, under the control of the swivel unit 64.

The housing 63 includes a chamber 74 having a top wall 75 and a bottom wall defined by the intermediate base 72. A motor unit 80 is loosely disposed within the chamber 74 and comprises a conventional speed reduction gear box 81 and a motor 91. The gear box 81 is spaced remote from the swivel unit 64. The gear box 81 may be of any conventional type, for example of the type shown in FIG. 13, namely one having a driving worm shaft 82 and a driven gear 83 disposed in a gear case 84. The axis of the driven gear 83 is vertical in FIGS. 7 and 13 and stub shafts 85 and 86, coaxial with the driven gear 83, extend upward and downward from, and are fixed to, the gear case 84. Opposed bosses 87 and 88 extend coaxially toward each other and into the chamber 74 from the top wall 75 and intermediate base 72, respectively. The bosses 87 and 88 are provided with coaxial bearing recesses 90 in which are pivotally supported the stub shafts 85 and 86.

The motor 91 is a reversible electric motor, preferably battery operable, which is fixedly mounted on the gear case 84 at the rightward (FIG. 7) end thereof and has an output shaft defining the driving gear shaft 82 of FIG. 13. The motor 91 is thus leftwardly cantilevered from the gear box 81 and is loosely received in the chamber 74, such that the motor 91 is pivoted on the axis of the stub shafts 85 and 86 (vertical axis in FIG. 7) and is free to swing pivotably in a plane (horizontal in FIG. 7) parallel to the intermediate base 72, to assume positions indicated in broken lines at 91' and 91" in FIG. 8.

The motorized drive unit further includes a pulley chamber 92 (FIGS. 6, 7 and 13) formed by the top wall 75 of the housing 63, by leftward and side walls 93 and 94 upstanding from the top wall 75, and by the top wall 95 and depending end wall 96 of a cover 97. The top wall 95 of the cover 97 is secured to the housing 63 by suitable removable means, such as screws 100 (FIG. 6).

The motorized drive unit further includes a drive pulley 101 (FIGS. 6, 7, 11 and 13) comprising a sheave 102 having a circumferential groove 103 for receiving the outrigger line OL circumferentially therein. A drive shaft 104, is fixed to and depends coaxially from the sheave 102 and at its lower end is positively driven by the driven gear 83 (FIG. 13), the shaft 104 being received for relative rotation through a central opening in the upper boss 87 and thence in the upper end of the gear case 84.

In the particular embodiment shown, the pulley 101 is rotatably supported not by rotative bearing relation on the housing 63 and cover 97 as above described. More particularly, in the embodiment shown, the pulley 101 includes coaxially upper and lower stub shafts 104 and 105 respectively rotatably supported by hollow cylindrical bosses 110 and 111 respectively depending from the cover 95 (FIG. 13) and upstanding from the top wall 75 coaxially of the stub shafts 85 and 86 and hence of the sheave 102. In addition, the boss 87 has a radially inward extending annular flange 107, in which the lower pulley stub shaft 106 rests rotatably. In addition, the depending boss 110 of the cover 97 extends downward to the top surface of the sheave 102. The flange 107 and depending boss 110 thus act as axial thrust bearings to maintain the pulley in its desired axial location in the pulley chamber 92.

In the embodiment shown, the lower pulley stub shaft 106 is provided with a series of circumferential grooves 112 which coact with the upstanding boss 111 rising above the housing top wall 75, to effect a labyrinth seal to prevent water carried by the outrigger line OL from moving downward therepast into the chamber 74 or into the gear case 84. To make this labyrinth seal even more effective, the grooves 112 may be packed with water proof grease.

Figure 9:
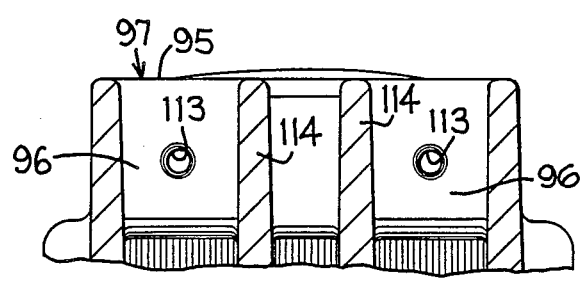
FIG. 9 is a sectional view substantially taken on the line IX—IX of FIG. 7.

To permit wrapping of the outrigger line OL around the sheave 102, two holes 113 are provided in the dependent wall 96 of the cover 97 as seen in FIGS. 7 and 9, such holes 113 being disposed in the central plane of the outrigger line as it passes around the pulley sheave 102 and spaced laterally to permit the outrigger reaches 30 and 40 to pass in parallel into and out of the pulley chamber 92. The size of the holes 113 is such as to allow a clean sliding fit of the outrigger line OL therethrough while tending to help strip off any water that may be on the reach of the line entering the pulley housing.

In the embodiment shown, the depending wall 96 of the cover 97 has two separate, laterally spaced parts, as seen in FIG. 9, such parts being located between four upstanding ribs 114 on the rightward (FIGS. 7 and 8) end of the housing 63. The four ribs 114 are arranged in pairs loosely flanking the respective outrigger line reaches 30 and 40, as in FIGS. 5 and 8. The ribs 114 limit the angle of deflection of the line reaches 30 and 40 with respect to the rightward end of the housing 63 and holes 113.

To positively prevent the outrigger line OL from jumping out of the groove 103 of the sheave 102, the sheave is shrouded on three sides, namely by the upstanding wall 93 (FIG. 7) behind the sheave 102, thereby upstanding side fences 116 and 117 (FIG. 13).

The pulley sheave 102 was specially developed to orbitally drive a conventional outrigger line, for example of 1/8 inch diameter conventional (widely available) Dacron or Nylon line. Conventional "braided" line is preferred, namely the kind having a braided cover surrounding a multi-strand core, rather than so called "twisted strand" line. Various pulley materials were tested to determine the coefficient of friction with Nylon and Dacron line, and the results of these tests showed a polyurethane pulley to have the best coefficient of friction when used with such lines.

Experimentation with different pulley "V" configurations led to the configuration shown in FIG. 11 wherein the groove 103 has only one sloped (conical) face 120, the other face 121 being planar (flat or radial).

Experimentation with different "V" configurations revealed no satisfactory configuration until the FIG. 11 sheave 102 was developed. It was found, with one face 121 flat and the other one sloped at an angle AA of about 7 to 8 degrees (preferably 7 ½ degrees) to a plane perpendicular to the pulley rotational axis, that excellent driving characteristics could be achieved with a line of the above described type. It was found that sloping the face 120 at 6 degrees to a plane perpendicular to the rotational axis was too tight an angle and that the outrigger line OL would tend to become locked in the pulley groove 103. On the other hand, it was found that angling the face 120 at more than 9 degrees to a plane perpendicular to the rotational axis did not permit the slopped face 120 to press the outrigger line OL with sufficient force against the radial face 121 as to drive the outrigger line OL properly. Therefore, a face 120 between 6 and 9 degrees is required for properly driving such outrigger line OL.

What makes the drive pulley 101 work so well is believed to be the fact that the optimally angled face 120 rolls the line OL (about the longitudinal axis of such line) into the flat face 121 at enough compression to create a high coefficient of friction between the line OL and the two faces 120 and 121 of the sheave 102. In experimental testing we found the FIG. 11 sheave 102 to be considerably more effective than a standard symmetrical V-pulley for driving the outrigger line OL.

The axial width of the groove 103 is such that the outrigger line is received therein with the radially outer surfaces of the sheave 102 and outrigger line OL being generally flush or with the outrigger line being slightly offset radially inward from the perimeter of the sheave 102. The groove 103 is sufficiently deep that the outrigger line never reaches the radially inward extent, or "bottom", of the groove in use.

The friction (between outrigger line OL and the sheave 102) created by the shape of the sheave 102 is governed more by that sheave shape than by the tension on the line OL. For standard "V" belt drives, the coefficient friction between the "V" belt and the metallic face of a V-pulley is determined by the tightness (tension) of the belt. The tendency of a loose "V" belt to squeal is well known as a sign of insufficient tension in a conventional "V" belt drive. The inventive sheave 102 does not require the outrigger line OL to be as tightly tensioned as a conventional "V" belt to get the same degree of energy transmission.

Therefore, with a looser circular cross-section belt, such as outrigger line OL, one would expect less wear on the bearings supporting the pulley and motor shaft and less energy consumed by the belt. The inventive sheave 102, as mentioned, uses a circular cross-section linear belt having reinforcing fibers in the center of the belt, rather than reinforcing fibers at the outside edge of the belt as in the usual "V" cross-section belt. Thus, the reinforcing fibers in applicant's circular cross-section belt would flex less in each orbit because they are located in the center of the belt and not at the radially outer or inner face of the belt as in the case of a conventional "V" belt. Accordingly, stress on the reinforcing fibers should be less in the center reinforced circular cross-section belt utilized by the present invention, than any standard "V" belt.

An additional perceived advantage of the present inventive pulley drive of FIG. 11 is that pretwisting of the central reinforcing fibers (schematically indicated at 122 in FIG. 11) (rather like the three strands of the standard twisted strand nylon line widely used in small boat anchor line) will tend to slowly roll, or rotate, the outrigger line about its length axis as it orbits, tending to make all 360 degrees of the circumference of such circular cross-section line or belt available for wear by the faces of the sheave 102. Further, slow rotation of the circular cross-section belt about its own length axis would alternate the belt flexure as it bends around the sheave 102 so that any one side of the linear belt would alternate in tension and compression. Accordingly, it is contemplated that the wear on the circular cross-section line or belt by the sheave 102 would be less, tension on the belt would be less, and the energy consumed by the drive would therefore be less, giving a more efficient, long lasting, quieter drive system.

A line stripper 140 (FIGS. 6 and 7) is fixed by a screw 141 to the underside of the top wall 95 of cover 97 adjacent the depending wall 96 of the cover and between the outrigger line holes 113 The stripper 140 includes a blade-like portion 142 which extends radially inward toward the center of the pulley groove 103. As seen in FIG. 7, the blade-like portion 142 conforms closely (through in clearance relation) to the asymmetric V-shape of the pulley groove 103 and extends nearly to the full depth of the groove 103. As seen in FIG. 6, the sides of the stripper 140, including the blade-like portion 142 thereof, are substantially tangent (as indicated at 143) to the hub 144 of the sheave 102. The radially outer portion of the stripper 140 steps up above the blade-like portion 142 to contact the underside of the top wall 95 of the cover 97 and forms a curved step 145 which closely clears the upper plate 124 of the pulley sheave 102. The stripper 140 positively precludes the reach of the outrigger line OL, leaving the sheave 102, from wrapping itself around the sheave 102. More particularly, the reach of the outrigger line OL leaving the sheave 102 is striped from the groove 103 by such stripper so that it exits cleanly from the housing through the corresponding hole 113 (FIG. 9).

Turning now to the electrical system for controlling and driving the motor 91, FIG. 12 discloses a manual control circuit 15?. A suitable electrical source, for example 151 of the fishing boat FB, connects through conductors 152 to the center terminals of a double pole, double throw reversing switch 153 of a conventional type. Preferably one of the conductors 152 includes a fuse or circuit breaker 154 for safety purposes. The electric input terminals of the motor 91 are connected by further conductors 155 to appropriate terminals of the reversing switch 153 in a conventional manner. The switch 153 has alternative positions for forward driving the motor 91, reverse driving the motor 91 and deactuating the motor, as generally indicated at F (forward), R (reverse), and N (off). The reversing switch has a manually engageable actuator handle 156 seen in FIGS. 6 and 7.

Using the manual circuit 150, setting the reversing switch 153 in its forward position F actuates the motor 91 to drive the pulley sheave 102, and hence the outrigger line OL, in a direction to move the traveller 12 away from the boat and toward the outboard pulley OP on the outrigger boom B. Alternately, setting the switch 153 in its reverse position R reverses the directional rotation of the motor 91 and hence of the pulley sheave 102 and thereby of the outrigger line OL so as to move the traveller 12 back inboard toward the boat FB. The switch 153 is preferably of the type that requires the operator's hand continuously on it to maintain it in its forward or reverse position, so that release of the switch by the operator automatically returns it to its neutral position N. The operator is responsible for avoiding continued actuation of the motor 91 after the traveller 12 has reached its inboard or outboard limit.

Figure 8:
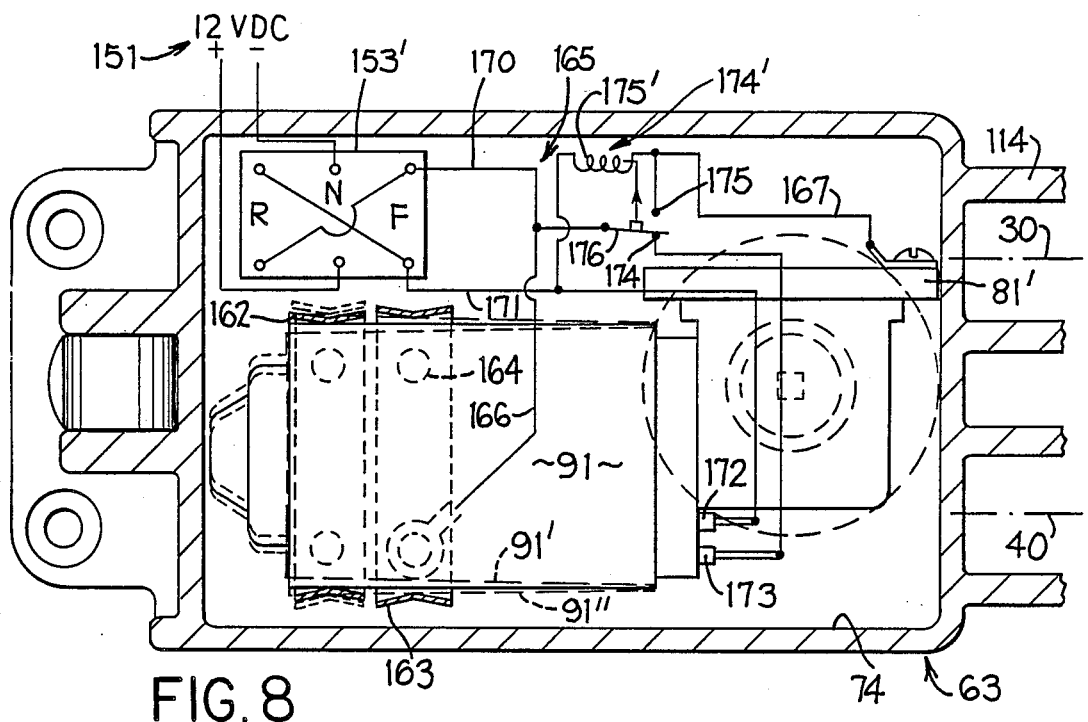
FIG. 8 is a sectional view substantially taken on the line VIII—VIII of FIG. 7 and schematically showing electric circuitry and switching associated with the FIG. 5 motorized drive unit.

On the other hand, it will normally be more convenient for the fisherman if he could simply place a reversing switch in the desired forward or reverse setting, walk away from it, and have suitable circuitry automatically control the motor 91 as it carries the traveller toward its intended destination and then automatically shut off the motor 91 when the traveller reaches its desired destination. Such an automatic arrangement would allow the fisherman to devote his attention to boat or fishing line handling after starting the traveller in motion and is thus a substantial convenience to the fisherman. Accordingly, FIGS. 7 and 8 disclose a preferred embodiment of such an automatic electric motor control, generally indicated at 160. Turning to FIG. 8, such automatic control 160 includes a reversing switch 153' which is manually actuable like the above described switch 153 but does not spring return itself to off (neutral) position upon being manually released by the operator. More particularly, the reversing switch 153' stays in the position R, N or F in which it is placed by the fisherman, until the fisherman shifts it to a different position.

Means are provided for automatically stopping the motor when the traveller reaches the inboard and outboard ends of its travel. In the preferred embodiment shown, such means utilizes the pivot mounting of the motor 91 about the rotation axis (vertical in FIG. 7) of the pulley sheave 102. Such means comprises a resilient U-shaped member 162 (FIGS. 7 and 8) fixed atop the intermediate base 72 adjacent the leftward end of the motor 91 and snugly straddling the motor 91 for resiliently resisting pivoting of the motor 91 about the rotational axis of the pulley sheave 102. The resilient U-shaped member 162 does however permit, in a resilient manner, pivoting of the motor 91 at least to the dotted line positions 91' and 91" of FIG. 8.

Figure 10:
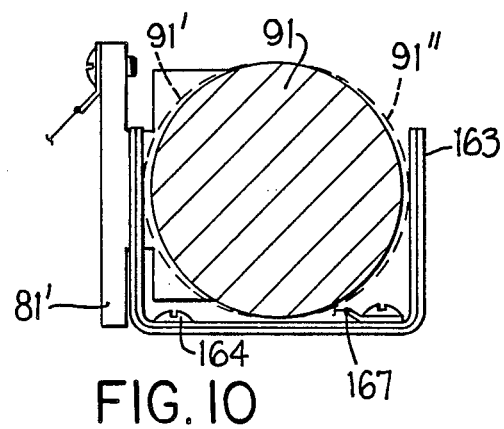
FIG. 10 is a sectional view substantially taken on the line X—X of FIG. 7.

A conductive U-shaped member 163 loosely straddles the motor 91, near the resilient member 162 and is similarly fixed, here by screws 164, to the intermediate base 72. The casing of the motor 91 has an electrically conductive surface, as does the gear box 81, including the base 81' thereof (FIGS. 8 and 10). The motor casing is electrically conductively connected with the base 81+ of the gear box 81. The conductive U-shaped member 163 and casing of the motor 91 form a motor torque responsive switch. Normally the casing of the motor 91 is held out of contact with the conductive U-shaped member 163 by the resilient U-shaped member 162. However, when the traveller comes to the outboard pulley or to the motorized drive unit ends of its travel, the torque of the motor 91 and gear box 81 cause the casing of the motor 91 to pivot against the resilience of the resilient U-shaped member 162 and into contact with one side or the other of the conductive U-shaped member 163, thereby closing an electrically conductive path between the conductive U-shaped member 163 and the conductive casing of the motor 91 and gear box 81.

A torque responsive circuit 165 (FIG. 8) connects through conductors 166 and 167 to the conductive U-shaped member 163 and gear box base plate 81' (which together define the torque responsive switch) above mentioned. The torque responsive circuit 165 controls automatic shut off of the motor 91 and in the embodiment shown comprises conductors 170 and 171 connected to one pair of selectable terminals (here the F or forward terminals) of the reversing switch 153'. The DC motor 91 has electric input terminals 172 and 173. Motor terminal 172 connects to conductor 171 and thence to the lower F output terminal of the reversing switch 153'. On the other hand, motor terminal 173 connects through a normally closed relay contact 174, of a conventional single pole double throw relay 174', to the conductor 170, in turn connected to the lower F output terminal of the reversing switch 153'.

Thus, with the reversing switch 153' actuated for energization of its forward terminals F, conventional current flow is from the lower F terminal through line 171 to motor terminal 172, through the windings of the motor, motor terminal 173, normally closed contact 174, and conductor 170 to the upper F terminal of reversing switch 153' for running the motor 91 in the forward direction. On the other hand, with the reversing switch 153' set to its reverse position R, conventional current flow is through the upper F terminal, line 170, normally closed contact 174, the motor terminal 173, the motor windings, motor terminal 172 and line 171 back to the lower F terminal, to run the motor in the reverse direction. It will be apparent that the reversing switch simply reverses the polarity of the voltage from the DC supply 151 applied to the motor 91 to run it in forward or reverse direction. Depending on the setting of the reversing switch, either the upper F terminal or lower F terminal of the reversing switch 153' may be positive in polarity.

Turning now to the automatic stopping feature of the torque responsive circuit 165, same in the present embodiment comprises the relay 174' which has a coil 175' actuable to open normally closed contact 174 and close a normally open contact 175 (the relay being spring biased to close the normally closed contact 174 as schematically indicated in FIG. 8). Actuation of the relay 174' opens contact 174 and closes contact 175. The torque responsive switch conductor 167 here connects through coil 175' and line 171 to the lower F terminal. Conductor 170 from the top F terminal of reversing switch 153' here connects to the switch arm 176 of relay 174'. As a result, with the torque responsive switch (defined by the casing of the motor 91 and conductive U-shaped member 163) closed, the reversing switch in either its forward position F or rearward position R flows current through the coil 175', opens its contact 174, thereby shutting off the motor, and closes its contact 175 thereby continuing to flow current through coil 175' even when torque responsive switch 167, 163 opens in response to spring 162 returning the motor 91 to its central, rest position shown in solid lines in FIG. 8. In the particular torque responsive circuit 165 shown, motor shut off in response to excessive motor torque (traveller at one end or the other of its travel) causes the relay coil 174' to set up a magnetic field which pulls up an iron (or the like) element fixed with respect to the switch arm 176 of the relay, regardless of the polarity of current flow through the coil 175', in a conventional manner.

It is contemplated that, instead of the electromagnetic torque responsive circuit 165 shown, one may employ a conventional electronic torque responsive means, or other desired torque responsive means, not shown.

OPERATION

The operation of the inventive apparatus will be apparent from the above description. However, for convenient reference, same is briefly summarized below.

Prior to use, the motorized drive unit 11 is fixed to any desired surface of the fishing boat FB adjacent to the outrigger boom B. The outrigger line OL is reeved through the outboard pulley OP at the free end of the boom and through the sheave 102 of the motorized drive unit, the outrigger line OL passing into the housing 63 through the holes 113 (FIG. 9). The center reach of the outrigger line OL is reeved through the slot 26 and past the guide pulley 25 of the traveller 12. The free ends of the outrigger line are secured to the traveller 12 in the manner shown in FIG. 2. The arms 22 of the traveller 12 preferably are in their bent inward position to tension the outrigger line OL. With the traveller 12 in its inboard position adjacent to the motorized drive unit 11, the fishing line FL is free to run through the catch 56 of the line release 13.

By shifting the reversing switch 153' of the automatic control 160 to its appropriate position, for example its forward position F, the motor 91 is energized to cause the drive pulley to advance the outrigger line therethrough in a direction to send the traveller away from the fishing boat FB and toward the outboard pulley OP.

When the traveller reaches the outboard pulley OP and its further outward travel is thus blocked, the torque of the motor 91 causes the motor to pivot around the rotation axis of the pulley sheave 102, thereby closing the torque responsive switch defined by the U-shaped conductor 163 and the casing of the motor-gear box unit 91, 81. This actuates relay 174', opening the contact 174 (FIG. 8) and thus blocking current flow through the motor 91, so that the motor is de-energized.

Should a fish strike the lure at the end of the fishing line FL, the release 13 releases the fishing line FL in a conventional manner and the fisherman is free to play the fish.

When it is desired to replace the fishing line in the line release 13 of the traveller 12, the latter is brought inboard toward the motorized drive unit by placing the reversing switch 153' in its opposite, for example reverse, position R. As the reversing switch 153' passes through its neutral position toward its reverse position R, current to the coil 175' is lost and such coil is de-energized, closing contact 174. With the reversing switch 153' finally in its reverse position R, the motor 91 is actuated in its opposite direction, actuating the pulley sheave 102 to rotate in its opposite direction, and thereby causing the outrigger line to bring the traveller 12 toward the boat and motorized drive unit 11. When the traveller reaches the end of its travel and thus abuts the ribs 114 on the adjacent end of the motorized drive unit housing 63, the tension on the other reach of the outrigger line OL greatly increases, causing motor torque to swing the motor-gear box 91, 81 in the opposite direction and thus to once again close the torque responsive switch defined by the conductive U-shaped member 163 and by the casing of the motor-gear box 91, 81. Since the reversing switch 153' is now in its reverse position R, current flow though the torque responsive switch actuates coil 175', thus opening contact 174 and de-energizing the motor 91. In this way, the traveller 12 is positioned for reattachment of the fishing line to its line release 13.

Thereafter, the traveller 12 can be shifted to its outboard position by shifting the reversing switch 153' from its reverse position R through neutral to its forward position F. Again, as the switch 153' passes through neutral, it breaks the current flow path to the energized coil 175', thus insuring the contact 174 will be closed and therefore that the reversing switch 153' in its forward position F can actuate the motor 91 in a direction to shift the traveller 12 outboard.

MODIFICATION

The advantageous results provided by above discussed sheave 102 and circular cross-section outrigger line OL would be even more noticeable in the system utilizing a drive sheave like sheave 102 in FIG. 11, with an endless, circular cross-section belt to drive a similar second pulley, wherein the belt could fully continuously rotate about its own axis. Thus, use of the inventive sheave 102 for various belt drives, in addition to motorized outrigger drives, is contemplated. It is contemplated that a pair of inventive sheaves 102 and corresponding endless circular cross-section line can be used in place of conventional, e.g. "V" belt, drives.

Although the sheave 102 of FIG. 11 may be made in one piece, or at least so that the plates 123 and 124 defining the faces 120 and 121 are at least relatively fixed, it is contemplated that the two faces 120 and 121 of the sheave 102 do not need to be interlocked against relative rotation. Testing has been carried out with a sheave similar to sheave 102 but wherein one of the plates 123 and 124 was rotatably driven and the other was free to rotate with respect to the first. Relative rotatability between the plates 123 and 124 appears to have no affect on the efficiency of energy transfer by the sheave and circular cross-section line or belt. It is contemplated that the relative rotatability between the faces 120 and 121 may even perhaps improve the coefficient of friction with respect to the circular cross-section belt by allowing such belt to cross-sectionally distort and move somewhat deeper down into the "V" angle AA between the faces 120 and 121. The circular cross-section line or belt would also be able to uncouple itself from the sheave 102 as it moved chordally out of the sheave due to the ability of the circular cross-section belt to roll with respect to the sheave faces 120 and 121.

The combination of the sheave 102 of FIG. 11 with a circular cross-section belt would make an excellent variable speed drive since one of the plates 123 and 124 could be shifted axially with respect to the other, thereby changing the effective diameter of the sheave 102 and hence the drive ratio of the pulley drive, i.e. change the longitudinal belt speed. Thus, the sheave 102 and circular cross-section belt is also perceived to be the basis for a variable speed drive. See the example schematically shown in FIG. 14.

Figure 14:
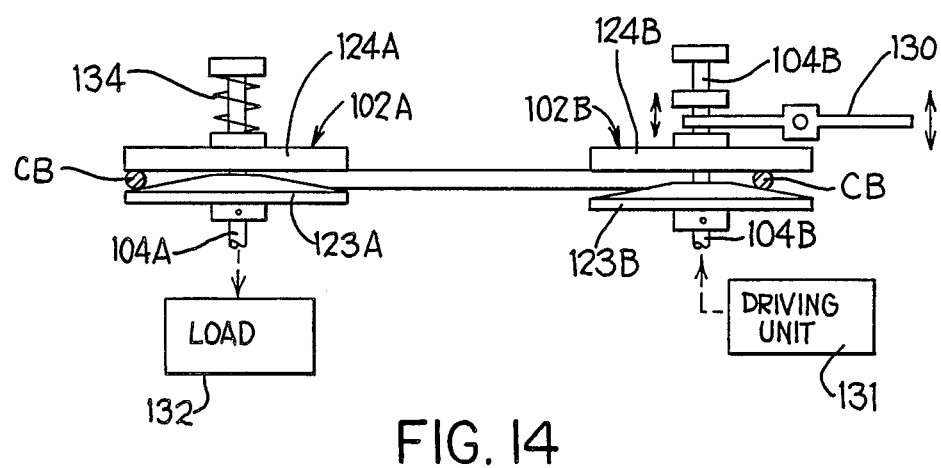
FIG. 14 is a schematic view of a pulley drive system utilizing pulley sheaves of the kind shown in detail in FIG. 11.

In the FIG. 14 continuous belt, variable speed drive, a pair of sheaves 102A and 102B are similar in configuration to sheave 102 of FIG. 11, but have axially separable plates 123A, 124A and 123B and 124B. In FIG. 14, the sheave 102B has at least one of its plates drivingly connected to a shaft 104 in turn driven by a driving unit 131 (e.g. motor). The plate 124B is axially slidable along a shaft 104B to change the effective diameter of the sheave 102B, in response to manipulation of a pivoted yoke 131. At least one of the plates 123A and 124A of sheave 102A is fixed for rotation to a driven shaft 104A in turn connected to a suitable load 132 to be driven. One plate, here plate 124A, is axially urged by a spring 134 toward the other plate 123A so as to minimize the width of the groove between the plates 123A and 123B, and thereby tend to maintain the circular cross-section belt CB tensioned. In operation, the drive ratio is changed by shifting the yoke 130, e.g. to increase the effective diameter of the sheave 102B. This increases belt tension, pulling the belt CB deeper into the groove of driven pulley sheave 102A, and thereby shifting plate 124A against spring 134 and axially from plate 123A, to change the drive ratio.

Although various materials are contemplated, in one embodiment the following materials were found to be advantageous:

(1) mounting base 60, housing 63, stripper 140: Lexan (General Electric)

(2) pulley 101: urethane (or aluminum).

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A motorized outrigger drive for an outrigger of a fishing boat, the outrigger being of the kind having a boom fixedly cantilevered laterally outboard from the side of the boat for releasably trailing a fishing line from a point laterally spaced outboard from the side of the boat and thereby to minimize risk of tangling fishing lines when simultaneously trolling with several fishing lines, said outrigger drive comprising:

an outrigger line;

an outboard line direction changing means at the free end portion of said boom;

motorized drive means fixed with respect to said boat and boom and actuable for reversibly feeding said outrigger line around said outboard line direction changing means;

traveller means carried on said outrigger line and having means of supporting a fishing line release, said motorized drive means comprising a mounting base for fixed mounting with respect to said boat, means mounting said motor means on said mounting base, and means responsive to approach of said traveller means to said outboard line direction changing means or boat for automatically stopping drive of said outrigger line by said motor means.

2. The apparatus of claim 1 in which said means mounting said motor means onto mounting base comprise an intermediate base and swivel means mounting said intermediate base on said mounting base for pivotal motion of said intermediate base about two mutually transverse axes on said mounting base.

3. The apparatus of claim 2 in which said motorized drive means comprise a drive pulley adjacent one end of said mounting base, namely the end closest to said free end of said boom, said swivel means being adjacent the other end of said mounting base, namely the end furthest from said free end of said boom, so that said pulley is free to swivel into alignment with said outrigger line extending from said outboard line direction changing means.

4. The apparatus of claim 2 in which said swivel means comprises a post rotatable with respect to said mounting base and about a first axis generally perpendicular to said mounting base, and cross pivot means rotatable with respect to said post and about a second axis transverse to said first axis and substantially parallel to said mounting base.

5. The apparatus of claim 2 in which said means mounting said motor means on said mounting base further comprises motor pivot means for pivotally mounting said motor means on a third axis at least parallel to the rotational axis of said pulley, and therewith for allowing pivoting of said motor means about said third axis in response to increased tensioning of said outrigger line as said traveller means approaches said outboard line direction changing means or said boat.

6. The apparatus of claim 5 including means for yieldingly resisting said pivoting of said motor means about said third axis.

7. The apparatus of claim 6 in which said means for automatically stopping comprises a switch means interposed between said motor means and said intermediate base and responsive to pivoting of said motor means about said third axis as said traveller approaches said outboard line direction changing means or boat for deactuating said motor means, and in which said switch means comprises parallel connected first conductor means spaced close to opposite sides of said motor means and second conductor means on said motor means and normally spaced from and opposing said first conductor means and responsive to pivoting of said motor means in either direction about said third axis for making electrical contact with said first conductor means, said motorized drive means also comprising circuit means responsive to contact between said first and second conductor means for deactuating said motor, said first conductor means comprising a conductive U-shaped member on said intermediate base loosely straddling said motor means remote from said third axis and said second conductor means comprises an electrically conductive surface on said motor means.

8. The apparatus of claim 6 in which said means for yieldingly resisting comprises a resilient U-shaped member on said intermediate base and snugly straddling said motor means for resiliently resisting pivoting of said motor means about said third axis.

9. The apparatus of claim 5 in which said third axis is coaxial with the rotational axis of said drive pulley.

10. The apparatus of claim 1 in which said motorized drive means comprises motor means actuable for feeding the outrigger line, and circuit means connectable to an electrical supply and including switch means actuable in response to reaction of said motor means to approach of said traveller means to said outboard line direction changing means or boat, for deactuating said motor means and thereby for stopping driving of said outrigger line.

11. The apparatus of claim 10 in which said circuit means comprises a reversing switch actuable for reversing said motor rotation direction and therefore the travel direction of said traveller means with respect to said boat and outboard line direction changing means, said circuit means further including means responsive to actuation of said switch means for breaking an electrical connection to said motor means and thereby disabling same.

12. A motorized outrigger drive for an outrigger of a fishing boat, the outrigger being of the kind having a boom fixedly cantilevered laterally outboard from the side of the boat for releasably trailing a fishing line from a point laterally spaced outboard from the side of the boat and thereby to minimize risk of tangling fishing lines when simultaneously trolling with several fishing lines, said outrigger drive comprising:
an outrigger line;
an outboard line direction changing means at the free end portion of said boom;
motorized drive means fixed with respect to said boat and boom and actuable for reversibly feeding said outrigger line around said outboard line direction changing means;
traveller means carried on said outrigger line and having means of supporting a fishing line release, said motorized drive means comprising a mounting base arranged for fixed mounting on said boat, an intermediate base swivel mounted on said mounting base, motor means supported on said intermediate base, a drive pulley driven by said motor means, and means defining a pair of line guide ports adjacent to said drive pulley for guiding said outrigger line thereto.

13. The apparatus of claim 12 in which said motorized drive means comprises a line stripper mounted on said intermediate base adjacent said pulley and line guide ports for assuring that a portion of said outrigger line outgoing from said pulley leaves said pulley cleanly.

14. A motorized outrigger drive for an outrigger of a fishing boat, the outrigger being of the kind having a boom fixedly cantilevered laterally outboard from the side of the boat for releasably trailing a fishing line from a point laterally spaced outboard from the side of the boat and thereby to minimize risk of tangling fishing lines when simultaneously trolling with several fishing lines, said outrigger drive comprising:
an outrigger line;
an outboard line direction changing means at the free end portion of said boom;
motorized drive means fixed with respect to said boat and boom and actuable for reversibly feeding said outrigger line around said outboard line direction changing means;
traveller means carried on said outrigger line and having means of supporting a fishing line release, said motorized drive means comprising means defining a drive pulley for drivingly engaging and supporting said outrigger line, and motor means actuable for rotating said drive pulley, said drive pulley comprising a pair of flanges with opposed faces, namely a planar radial face and a conical face, with faces defining a circumferentially extending groove therebetween.

15. The apparatus of claim 14 in which the angle between said faces lies in the range of 6-9 degrees.

16. The apparatus of claim 15 in which the angle between said faces is about 7 ½ degrees.

17. The apparatus of claim 14 including means for rotatably driving one of said flanges from said motor means, the other said flange being rotatably with respect to said first flange.

18. The apparatus of claim 14 in which said outrigger line comprises a circular cross-section line of diameter to fit between said flanges near the circumference of said drive pulley so that the radially outermost surfaces of said outrigger line and flanges are approximately flush.

19. The apparatus of claim 18 in which said outrigger line is a conventional, braided shell, twisted core, rope adapted to roll about its length axes as it passes around said drive pulley due to engagement between said radial and conical faces, so as to evenly distribute pulley contact wear over the entire circumference of said outrigger line and thereby extend the useful line of said outrigger line.

20. A motorized outrigger drive for an outrigger of a fishing boat, the outrigger being of the kind having a boom fixedly cantilevered laterally outboard from the side of the boat for releasably trailing a fishing line from a point laterally spaced outboard from the side of the boat and thereby to minimize risk of tangling fishing lines when simultaneously trolling with several fishing lines, said outrigger drive comprising:
an outrigger line;
an outboard line direction changing means at the free end portion of said boom;
motorized drive means fixed with respect to said boat and boom and actuable for reversibly feeding said outrigger line around said outboard line direction changing means;
traveller means carried on said outrigger line and having means of supporting a fishing line release, in which the traveller means comprises means fixed to ends of said outrigger line to form an operatively closed loop, resilient means for tensioning said outrigger line, and release support means for supporting a fishing line release on said traveller means.

21. The apparatus of claim 20 in which said traveller means comprises a body, said body defining said resilient means and said means fixed to said ends of said outrigger line and said release support means, said body having spaced apart arms extending from a base portion, said arms including said resilient means and means fixed to said outrigger line, said arms being resiliently deflectable to tension said outrigger line.

22. The apparatus of claim 21 in which said body is of W-shape with said base portion defining the central, inverted V-portion of said W-shape, said arms being outboard of and resiliently fixed to said central inverted V-shape portion, said body being of stiff yet resilient material so as to tension said line and such that deflection of said line from its normal generally straight lie tends to cause said arms to deflect inward said central inverted V-shape portion.

23. The apparatus of claim 22 wherein the arms have free ends normally widely spaced from the inverted V-central portion of said W-shaped body, said arm free ends each having a pair of openings therethrough, one end of said outrigger line passing through a first opening at the free end of a first said arm, being looped around means on the free end of a second said arm and passing back into anchored relation with the free end of said first arm, the other end of said outrigger line passing through a first opening in the free end of said second arm, being looped around means on the free end of said first arm and passing back into anchored relation with the free end of said second arm, so that a pull on the outrigger line tends to pull said free ends of said arms together, said arms each including an elongate integral hinge portion adjacent the joinder of said arm to said central inverted V-shaped portion of said body, said body having means remote from said arm free ends for defining said means supporting said release.

24. The apparatus of claim 20 in which said outrigger line has two parallel reaches between said drive means and outboard line direction changing means, said traveller means comprising means for slidably engaging a first reach of said outrigger line and means fixed to adjacent ends of said outrigger line to define with said ends a second reach of said outrigger line, said traveller means including a body carrying said means fixed to said outrigger line and release support means, said means slidably engaging said outrigger line comprising a roller means on said body engaging said outrigger line first reach for movement of said body therealong, said drive means being actuable to move said outrigger line and hence move said traveller means along the path of said second reach of said outrigger line.

* * * * *